United States Patent
Adler et al.

(10) Patent No.: US 7,493,017 B2
(45) Date of Patent: Feb. 17, 2009

(54) CONVERGENT PLAYBACK OF BUFFERED CONTENT TO REAL-TIME CONTENT PLAY

(75) Inventors: Yoram Adler, Haifa (IL); Gal Ashour, Yokne'am Illit (IL); Konstantin Kupeev, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 11/143,381

(22) Filed: Jun. 2, 2005

(65) Prior Publication Data
US 2005/0271357 A1    Dec. 8, 2005

(30) Foreign Application Priority Data
Jun. 3, 2004  (GB) ................................. 0412342.8

(51) Int. Cl.
*H04N 5/91* (2006.01)
(52) U.S. Cl. ............................. 386/68; 386/110; 386/46
(58) Field of Classification Search .................... 386/81, 386/111, 112, 113, 68, 46, 109, 125, 126; 369/47.33; 345/204; 725/115; 709/231, 709/232
See application file for complete search history.

(56) References Cited

U.S. PATENT DOCUMENTS

| | | | |
|---|---|---|---|
| 6,304,714 B1 * | 10/2001 | Krause et al. | 386/52 |
| 6,678,227 B1 * | 1/2004 | Kondo et al. | 369/47.33 |
| 6,760,292 B1 * | 7/2004 | Sugahara | 369/53.31 |
| 6,950,605 B1 * | 9/2005 | Smolenski et al. | 386/126 |
| 2005/0213936 A1 * | 9/2005 | Schultz et al. | 386/68 |
| 2005/0240962 A1 * | 10/2005 | Cooper et al. | 725/38 |

* cited by examiner

*Primary Examiner*—Thai Tran
*Assistant Examiner*—Marc Danzenski
(74) *Attorney, Agent, or Firm*—Scully, Scott, Murphy & Presser, P.C.; Gail H. Zarick, Esq.

(57) ABSTRACT

Provides convergent playback of buffered content to real-time content play A content viewing system includes a content player to receive a content stream from a content source, a content viewer to receive the content from the content player, and a buffer into which the content player may store the received content and from which the player may provide the stored content to the content viewer, where the content player is operative to buffer the content stream to the buffer responsive to a request to pause play of the content stream, and retrieve the content from the buffer for playback of the buffered content stream responsive to a request to resume play of the content stream, thereby emptying the buffer, where the buffer is emptied at a faster rate than the rate at which the content stream is buffered, and the rate at which the buffer is emptied varies.

1 Claim, 4 Drawing Sheets

CONVERGENT PLAYBACK OF BUFFERED CONTENT TO REAL-TIME CONTENT PLAY

FIELD OF THE INVENTION

The present invention relates to playback of audio and/or visual content in general, and more particularly to convergent playback of buffered content to real-time content play.

BACKGROUND OF THE INVENTION

Many Digital Video Recording (DVR) systems allow users to pause the playing of a program during its broadcast. When the user pauses the play, program content is buffered to memory or another storage device. When the user wishes to resume play, the DVR provides playback of the buffered data from the point where program play was paused, typically at a speed that is faster than that of the broadcast program. In this way, once all the buffered data has been played, the user may "catch up" to the broadcast program for continued play at its normal speed and in real time. However, state-of-the-art systems that provide such capabilities transition instantaneously from fast playback of buffered data to real-time play, having a jarring effect on the viewer.

SUMMARY OF THE INVENTION

The present invention discloses a system and method for playback of buffered content that transitions smoothly to real-time content play. In one aspect of the present invention a content viewing system is provided including a content player operative to receive a content stream from a content source, a content viewer operative to receive the content from the content player, and a buffer into which the content player may store the received content and from which the player may provide the stored content to the content viewer, where the content player is operative to buffer the content stream to the buffer responsive to a request to pause play of the content stream, and retrieve the content from the buffer for playback of the buffered content stream responsive to a request to resume play of the content stream, thereby emptying the buffer, where the buffer is emptied at a faster rate than the rate at which the content stream is buffered, and the rate at which the buffer is emptied varies.

In another aspect of the present invention the buffering continues until the buffer is completely empty.

In another aspect of the present invention the content player is a Digital Video Recorder (DVR).

In another aspect of the present invention the content source is any of an antenna for receiving broadcast content, a satellite receiver for receiving content via satellite, and a cable for receiving cable broadcast content.

In another aspect of the present invention the content viewer is a television set.

In another aspect of the present invention a method is provided for retrieval and playback of buffered content, the method including buffering a content stream to a buffer responsive to a request to pause play of the content stream, retrieving the content from the buffer for playback of the buffered content stream responsive to a request to resume play of the content stream, thereby emptying the buffer, where the buffer is emptied at a faster rate than the rate at which the content stream is buffered, and the rate at which the buffer is emptied varies.

In another aspect of the present invention the buffering continues until the buffer is completely empty.

In another aspect of the present invention the retrieving step includes emptying the buffer at a rate that decreases over time.

In another aspect of the present invention a time allotted for completely emptying the buffer is determined in accordance with a predefined function of a given playback rate of content retrieved from the buffer.

In another aspect of the present invention a method is provided for deploying a content viewing system

BRIEF DESCRIPTION OF THE DRAWINGS

The present invention will be understood and appreciated more fully from the following detailed description taken in conjunction with the appended drawings in which.

DESCRIPTION OF THE INVENTION

Figure 1:
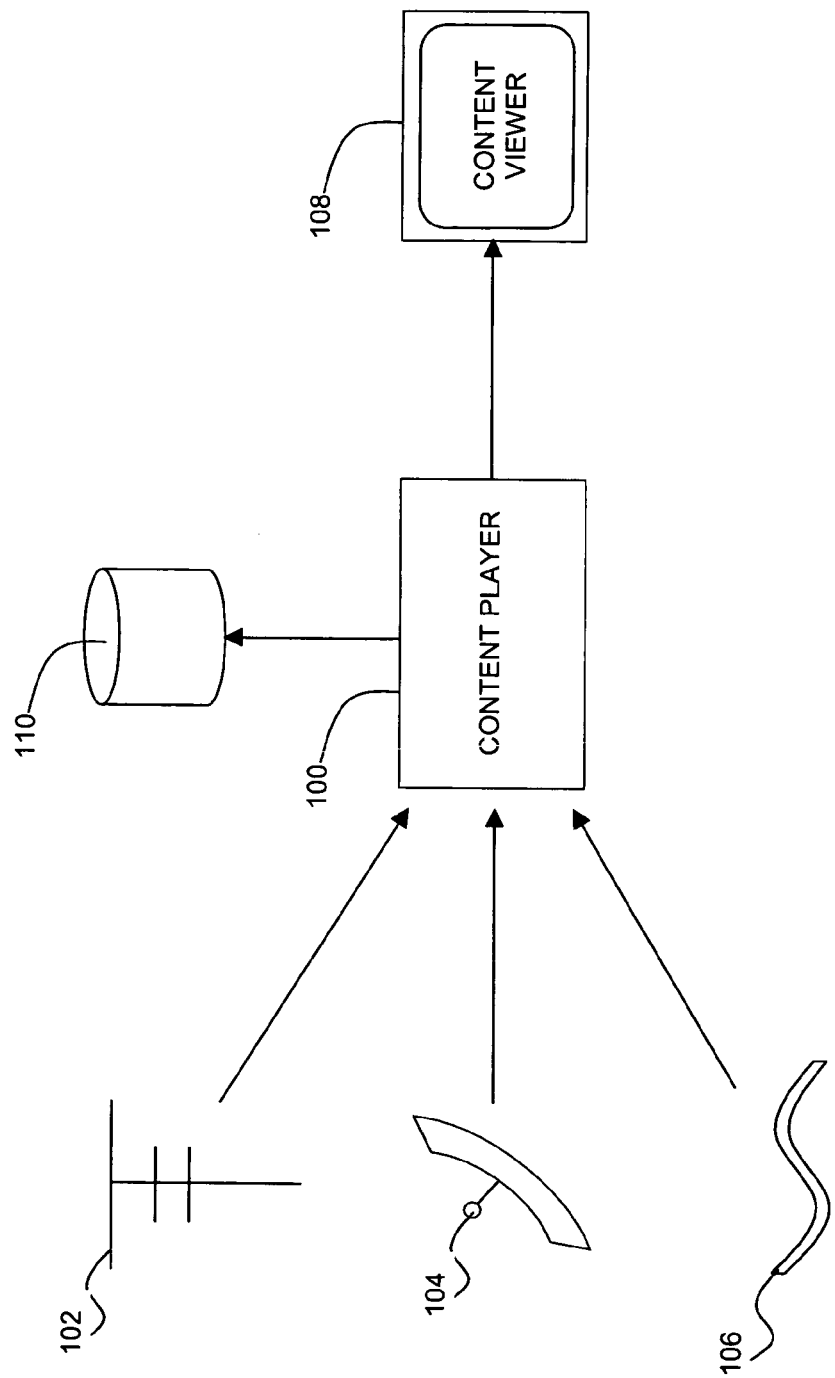
FIG. 1 is a simplified conceptual illustration of a content viewing system, constructed and operative in accordance with an advantageous embodiment of the present invention.

The present invention provides systems, apparatus and methods for playback of buffered content that transitions smoothly to real-time content play. In an example embodiment, a content viewing system is provided including a content player operative to receive a content stream from a content source, a content viewer operative to receive the content from the content player, and a buffer into which the content player may store the received content and from which the player may provide the stored content to the content viewer, where the content player is operative to buffer the content stream to the buffer responsive to a request to pause play of the content stream, and retrieve the content from the buffer for playback of the buffered content stream responsive to a request to resume play of the content stream, thereby emptying the buffer, where the buffer is emptied at a faster rate than the rate at which the content stream is buffered, and the rate at which the buffer is emptied varies.

In some embodiments: the buffering continues until the buffer is completely empty; the content player is a Digital Video Recorder (DVR); the content source is any of an antenna for receiving broadcast content; a satellite receiver for receiving content via satellite; and/or a cable for receiving cable broadcast content; the content viewer is a television set.

In another example embodiment of the present invention, a method is provided for retrieval and playback of buffered content, the method including buffering a content stream to a buffer responsive to a request to pause play of the content stream, retrieving the content from the buffer for playback of the buffered content stream responsive to a request to resume play of the content stream, thereby emptying the buffer, where the buffer is emptied at a faster rate than the rate at which the content stream is buffered, and the rate at which the buffer is emptied varies.

In some embodiments: the buffering continues until the buffer is completely empty; the retrieving step includes emptying the buffer at a rate that decreases over time; the method further includes playing the content stream prior to receiving the request to pause play of the content stream, pausing play of the content stream responsive to receiving the request to pause play of the content stream, playing the content retrieved from the buffer from the point at which play of the content stream was paused, and playing the content stream from the point past which the content stream ceased to be buffered; the retrieving step includes selecting for playback any frames of the content retrieved from the buffer in accordance with a selection frequency, and increasing the selection frequency from the time when the content is first retrieved from the buffer and until the buffer is completely empty; the retrieving step includes dropping any frames of the content retrieved from the buffer in accordance with a dropping frequency, and decreasing the dropping frequency from the time when the content is first retrieved from the buffer and until the buffer is completely empty; the playback rate of content retrieved from the buffer decreases in accordance with a predefined function of a given time allotted for completely emptying the buffer; the playback rate decreases linearly; and/or the present invention the playback rate decreases non-linearly.

In some embodiments of the present invention: a time allotted for completely emptying the buffer is determined in accordance with a predefined function of a given playback rate of content retrieved from the buffer; the playback rate decreases linearly; and/or the playback rate decreases non-linearly.

In another example embodiment of the present invention, a method is provided for deploying a content viewing system, the method including configuring a content player operative to receive a content stream from a content source, configuring a content viewer operative to receive the content from the content player, and employing a buffer into which the content player may store the received content and from which the player may provide the stored content to the content viewer, where the content player is operative to buffer the content stream to the buffer responsive to a request to pause play of the content stream, and retrieve the content from the buffer for playback of the buffered content stream responsive to a request to resume play of the content stream, thereby emptying the buffer, where the buffer is emptied at a faster rate than the rate at which the content stream is buffered, and the rate at which the buffer is emptied varies.

In another example embodiment of the present invention, a computer program is provided embodied on a computer-readable medium. The computer program including a first code segment operative to buffer a content stream to a buffer responsive to a request to pause play of the content stream, and a second code segment operative to retrieve the content from the buffer for playback of the buffered content stream responsive to a request to resume play of the content stream, thereby emptying the buffer, empty the buffer at a faster rate than the rate at which the content stream is buffered, and vary the rate at which the buffer is emptied.

Reference is now made to FIG. 1, which is a simplified conceptual illustration of a content viewing system, constructed and operative in accordance with an advantageous embodiment of the present invention. In the system of FIG. 1, a content player 100, such as a Digital Video Recorder (DVR), is operably coupled to one or more audio and/or video content sources, such as an antenna 102 for receiving broadcast content, a satellite receiver 104 for receiving content via satellite, or a cable 106 for receiving cable broadcast content. Player 100 is operably coupled to a content viewer 108, such as a television set, through which player 100 provides received content for viewing. Player 100 is also operably coupled to a buffer 110, which may be any volatile or non-volatile memory or data storage, into which received content may be stored, and from which stored content may be provided to content viewer 108 for viewing, such as in accordance with the content buffering and playback method described hereinbelow with reference to FIG. 2.

Figure 2:
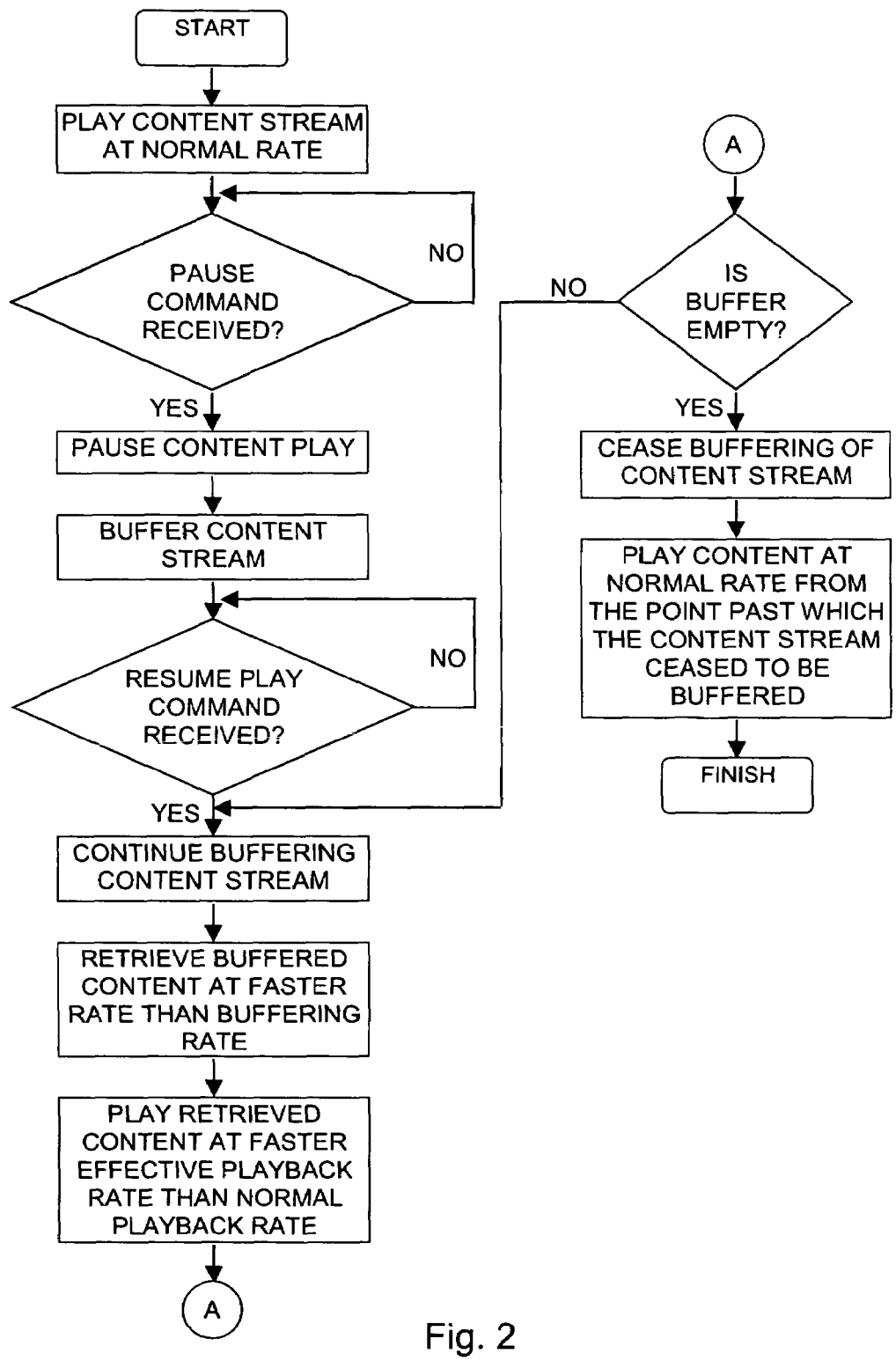
FIG. 2 is a simplified flowchart illustration of a method for content buffering and playback, operative in accordance with an advantageous embodiment of the present invention.

Reference is now made to FIG. 2, which is a simplified flowchart illustration of an exemplary method of operation of the system of FIG. 1, operative in accordance with an advantageous embodiment of the present invention. In the method of FIG. 2 content is received in real-time by player 100 and is provided to content viewer 108 for viewing. At any time during real-time content play, player 100 may pause content play, such as when the viewer sends a 'pause' command to player 100 using any known means. During a pause player 100 stores received content in buffer 110 rather than provide received content to content viewer 108 for viewing. When player 100 is to resume playing the received content, such as when the viewer sends a 'resume play' command to player 100 using any known means, player 100 retrieves the content stored in buffer 110 and provides the retrieved content to content viewer 108 for continued play from the point at which the viewing was paused.

While buffer 110 is being emptied of stored content, content that continues to be received in real-time by player 100 is preferably stored in buffer 110. Thus, content that was stored earlier in buffer 110 is preferably retrieved and provided to content viewer 108 before later-stored content. In order to ensure that buffer 110 is emptied, player 100 preferably retrieves content from buffer 110 at a faster rate than the rate at which buffer 110 is filled. Player 100 then preferably provides the retrieved content to content viewer 108, and content viewer 108 preferably presents the content for viewing, at a faster rate than the rate at which the content was captured and at which the content is normally played. For example, if the normal play rate for NTSC video is 30 frames/sec., player 100 may provide only every nth frame, such as every third frame, of the retrieved content to content viewer 108 for play at an accelerated effective play rate, where the selection frequency n preferably increases over time (e.g., providing every third frame for a period of time, then every second frame, etc.). Additionally or alternatively, player 100 may drop every mth frame, such as every tenth frame, of the retrieved content provided to content viewer 108 for play at an accelerated effective play rate, where the frame dropping frequency preferably decreases over time (e.g., dropping every tenth frame for a period of time, then every twentieth frame, etc.). The rate at which buffer 110 is emptied is preferably not constant, varying from the time when content is first retrieved from buffer 110 and until buffer 110 is completely empty, and preferably decreasing over time. Once buffer 110 is empty, content that continues to be received in real-time by player 100 is no longer stored in buffer 110, but is provided to content viewer 108 as before the pause. Thus, content stream play continues from the point past which the content stream ceased to be buffered. Methods for controlling the rate at which buffer 110 is emptied and at which content retrieved from buffer 110 is played are described hereinbelow with reference to FIGS. 3 and 4.

Figure 3:
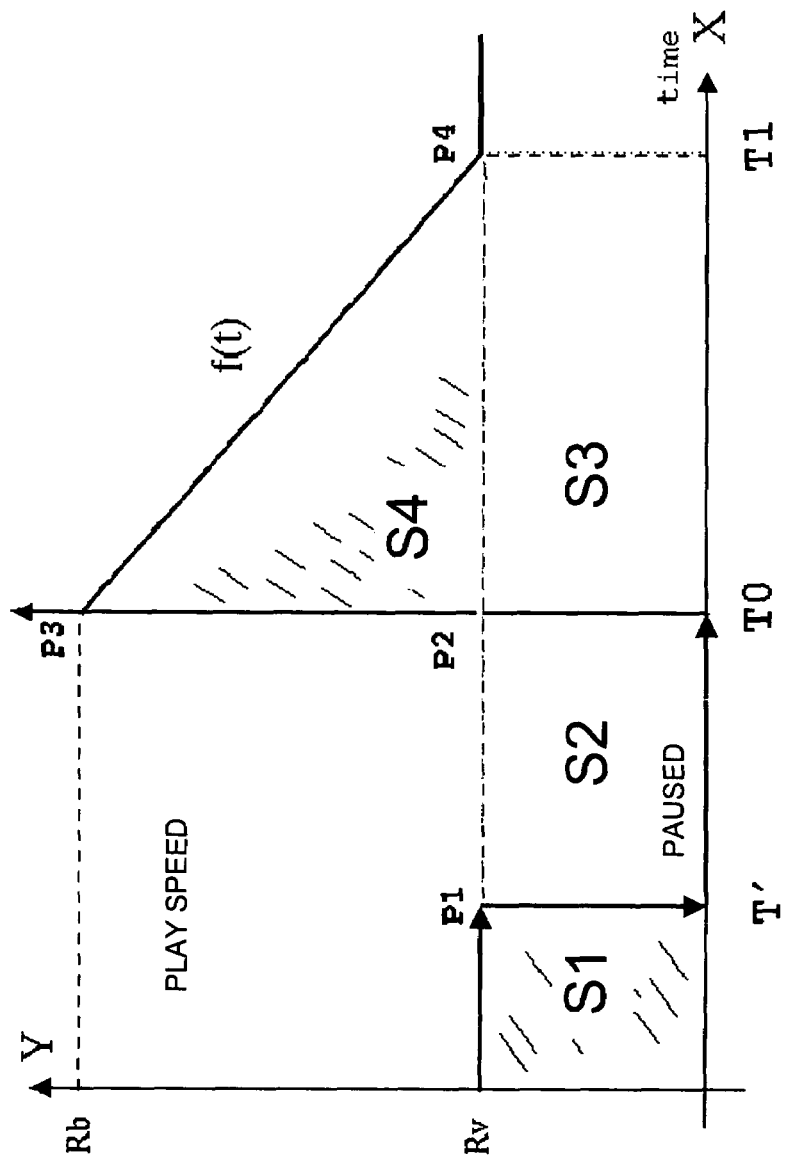
FIGS. 3 and 4 are simplified graphic illustrations of methods for convergent playback of buffered content to real-time content play, operative in accordance with an advantageous embodiment of the present invention.
Figure 4:
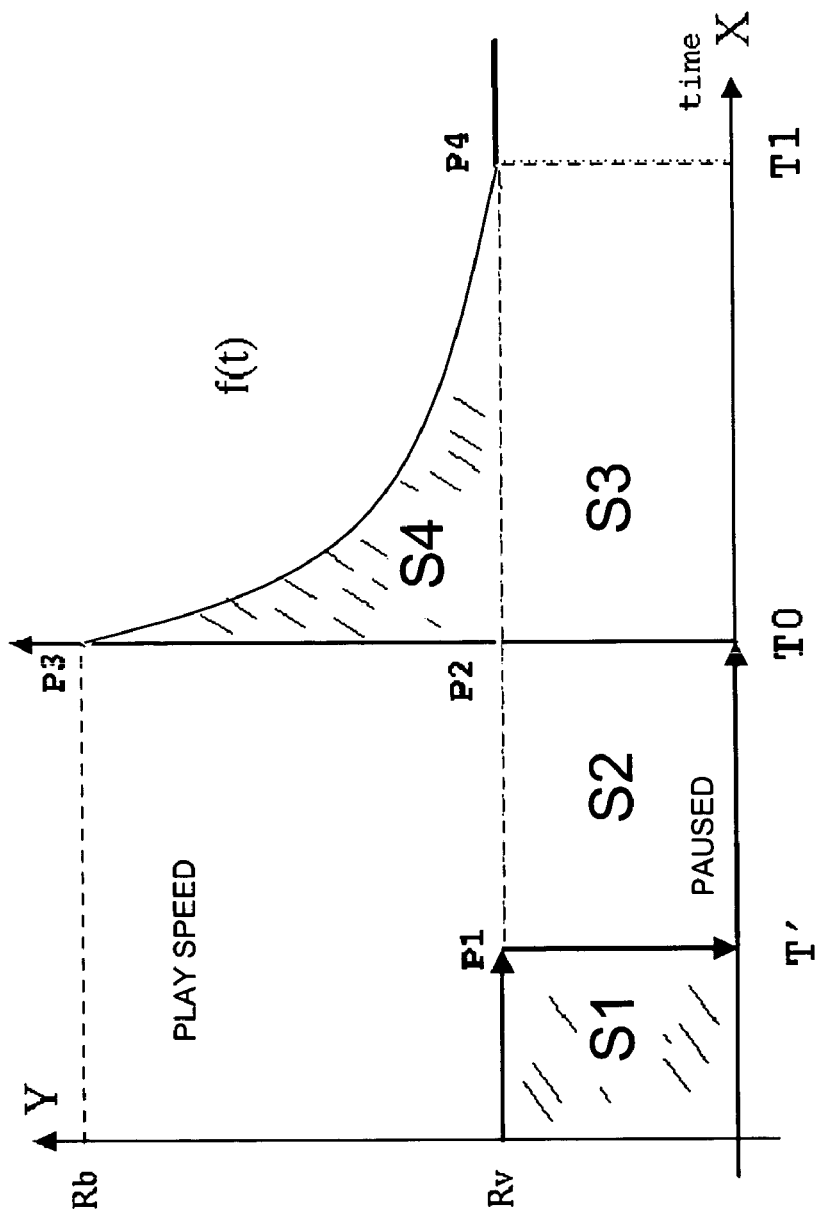

Reference is now made to FIGS. 3 and 4, which are simplified graphic illustrations of methods for convergent playback of buffered content to real-time content play, operative in accordance with an advantageous embodiment of the present invention. In FIG. 3, T' denotes the time when content play is paused, Rv denotes the normal (1×) content play rate, function f(t) denotes the target playback speed defined on segment [T0; T1] of content buffered subsequent to the pause. The X-axis of the Cartesian frame provides the time coordinate, while the Y-axis corresponds to the effective rate at which content is played. The points P0, . . . P4 correspond to the time instances T', T0, T1. The vertical location of P1, P2, P4 is defined by Rv. The vertical location of P3 is defined by Rb=Rb(T0), being the starting playback rate of buffered content. The target function preferably satisfies:

$$f(T0)=Rb \quad (1)$$

$$f(T1)=Rv \quad (2)$$

and the following constraint (C):

$$V(T1)=0$$

where V(t) denotes the volume of content stored in the buffer at time t.

S2 denotes the area bounded by the points P1, P2, T0, T', S3 denotes the area bounded by the points T0, P2, P4, T1, and S4 denotes the area bounded by the points P2, P3, P4.

In FIG. 3 the values Rv, T', T0, and T1 are predefined, f(t) is a linear function to be determined, and the value of Rb is to be determined. Thus, given that the buffer is to be emptied by time T1, the playback rate of buffered content is initially Rb, which decreases linearly along f(t) on segment [T0,T1].

f(t) may be determined by satisfying Eq. (1), Eq. (2) and constraint (C). Considering Eq. (1) and Eq. (2):

$$f(t) = (R_b - R_v)\frac{t - T_1}{T_0 - T_1} + R_v \quad (3)$$

Considering constraint (C), it follows that:

$$V1=V2$$

where V1 denotes the volume of the content stored in the buffer during time interval [T'; T1], and V2 denotes the volume of the content viewed during time interval [T0; T1]. It may be seen that:

$$V1=Rv(T1-T')$$

and thus:

$$V1=S2+S3.$$

It may also be seen that:

$$V_2 = \int_{T_0}^{T_1} f(t)\,dt = S3 + S4,$$

and thus:

$$V2 = S3 + S4.$$

Therefore, condition (C) may be expressed as:

$$S2=S4; \quad (4)$$

For linear function f(t):

$$S4=(Rb-Rv)(T1-T0)/2,$$

and:

$$S2=Rv(T0-T')$$

it follows that:

$$Rv(T0-T')=(Rb-Rv)(T1-T0)/2.$$

Thus, $$R_b = 2R_v \frac{T_0 - T'}{T_1 - T_0} + R_v \quad (5)$$

f(t) may then be determined using Eq. (3), where Rb is defined by Eq. (5)

In FIG. 4 the values Rb, Rv, T', and T0 are predefined, f(t) is a parabolic function to be determined, and the value of time T1 is to be determined. Thus, given a starting effective playback rate of buffered content along a parabolically decreasing f(t) on segment [T0,T1], the time to empty the buffer is to be determined. f(t) preferably satisfies the following derivative constraint at time T1:

$$\left.\frac{df(t)}{dt}\right|_{t=T_1} = 0; \quad (6)$$

Expressing f(t) in the following form:

$$f(t)=\lambda(t-T1)2+Rv \quad (7)$$

it may be seen that Eq. (2) and Eq. (6) hold for f(t). Therefore, λ and T1 may be determined such that Eq. (1) and constraint (C) are satisfied.

By Eq. (1):

$$\lambda(T0-T1)2=Rb-Rv \quad (8)$$

Expressing constraint (C) as:

$$\int_{T_0}^{T_1} f(t)\,dt = S2 + S3, \quad (9)$$

thus:

$$\lambda\frac{1}{3}(t-T_1)^3\Big|_{T_0}^{T_1} + R_v(T_1 - T_0) = R_v(T_0 - T') + R_v(T_1 - T_0).$$

Therefore:

$$-\lambda\frac{1}{3}(T_0 - T_1)^3 = R_v(T_0 - T');$$

Substituting the expression for λ (T0−T1)2 from Eq. (8) to Eq. (9) obtains:

$$-\frac{1}{3}(T_0 - T_1)(R_b - R_v) = R_v(T_0 - T').$$

Thus, T1 may be expressed as:

$$T_1 = \frac{3R_v(T_0 - T')}{R_b - R_v} + T_0 \quad (10)$$

and λ as:

$$\lambda = \frac{R_b - R_v}{(T_1 - T_0)^2}.$$

from which f(t) in Eq. (7) may be calculated.

It is appreciated that one or more of the steps of any of the methods described herein may be omitted or carried out in a different order than that shown, without departing from the true spirit and scope of the invention. It should also be appreciated throughout the specification and claims that references to "content" include audio and/or visual content, and that references to "viewing" refer to viewing and/or listening to content.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A method for retrieval and playback of buffered content, comprising:
    buffering a content stream to a buffer responsive to a request to pause play of said content stream;
    retrieving said content from said buffer for playback of said buffered content stream responsive to a request to resume play of said content stream, thereby emptying said buffer, said retrieving step further including:
    selecting for playback any frames of said content retrieved from said buffer in accordance with a selection frequency;
    increasing said selection frequency from the time when said content is first retrieved from said buffer and until said buffer is completely empty;
    dropping any frames of said content retrieved from said buffer in accordance with a dropping frequency; and
    decreasing said dropping frequency from the time when said content is first retrieved from said buffer and until said buffer is completely empty,
    wherein said buffer is emptied at a faster rate than the rate at which said content stream is buffered, and the rate at which said buffer is emptied varies, said buffer being emptied at a rate that decreases over time, and wherein the playback rate of content retrieved from said buffer decreases in accordance with a predefined function of a given time allotted for completely emptying said buffer and the playback rate decreases non-linearly;
    playing said content stream prior to receiving said request to pause play of said content stream;
    pausing pray of said content stream responsive to receiving said request to pause play of said content stream;
    playing said content retrieved from said buffer from the point at which play of said content stream was paused; and
    playing said content stream from the point past which said content stream ceased to be buffered.

* * * * *